UNITED STATES PATENT OFFICE.

ALCIDE FRANÇOIS POIRRIER AND DANIEL AUGUSTE ROSENSTIEHL, OF PARIS, FRANCE.

BLACK AZO DYE.

SPECIFICATION forming part of Letters Patent No. 502,912, dated August 8, 1893.

Application filed June 27, 1892. Serial No. 438,195. (Specimens.) Patented in France March 18, 1889, No. 196,793; in England March 19, 1889, No. 4,825, and in Germany March 25, 1889, No. 52,616.

*To all whom it may concern:*

Be it known that we, ALCIDE FRANÇOIS POIRRIER and DANIEL AUGUSTE ROSENSTIEHL, residents of the city of Paris, in the Republic of France, have invented a new and useful Improvement in the Manufacture of Azo Coloring-Matters, which is fully set forth in the following specification, and for which Letters Patent have been obtained as follows: in France, No. 196,793, dated March 18, 1889; in England, No. 4,825, dated March 19, 1889, and in Germany March 25, 1889, No. 52,616.

This invention consists in the production of coloring matters which have among other properties, that of dyeing wool in very deep colors, extending to black colors that resist the action of soap, the atmosphere, and light. These coloring matters are obtained in combining the diazo derivatives of the mono and disulfonic acids of aniline, of toluidins, of xylidins, and of isomeric naphthylamins with alpha naphthylamin, and then again diazotizing the compound obtained and combining it with the alkyl derivatives of metaphenylene diamine such as compounds of said diamine with phenyl or benzyl and also the corresponding secondary and tertiary derivatives of cresol and homologous alcohols.

Example: To the aqueous solution of the soda salt of thirty kilos of disulphonated alpha naphthylamin are added seven kilos of nitrite of soda and forty-five kilos of commercial hydrochloric acid. When the mixture is effected there are run into it nine hundred liters of a solution of alpha naphthylamin hydrochlorid representing 14.3 kilos of naphthylamin. As soon as the reaction is completed, the compound is diazotized again by adding twenty kilos of commercial hydrochloric acid and seven kilos of nitrite of soda dissolved in fifteen liters of water. The diazo compound which is precipitated, is collected and is introduced in the condition of paste into an alcoholic solution of twenty-six kilos of diphenylized meta-phenylene diamin. After standing for some hours, the liquid is acidified and the coloring matter, which separates from the alcoholic liquid, is collected on a filter and is finally converted into the soda salt.

The process is carried out in an analogous manner when for the diphenylized meta-diamin is substituted toluidized meta diamin, &c., or the corresponding cresylene-diamins.

We have given as a matter of example, the preparation of that product which possesses the greatest technical value.

The other compositions included in the invention and covered by the claims, present analogous but not superior qualities, and are mentioned for the purpose of showing the scope of the invention and to prevent evasion of the patent by colorable modifications. It will therefore suffice to describe the properties of the principal compound, which is known in commerce as "phenylene black." This compound is prepared for the market in the form of a paste, because in that form its application is easiest. In a dry state it constitutes a black powder, having a slightly bronze luster. It is but little soluble in water, which is thereby colored blue-black. The aqueous solutions of the soda-salt are precipitated by mineral acids. Hence the necessity of employing it, in a state of salt, and in a neutral bath for dyeing purposes. For printing on wool either a free acid or a salt may be used indifferently.

The property which mainly characterizes this black coloring matter, and distinguishes it from other black colors known in commerce, is its intense coloring power. With two per cent. of this coloring matter a deep blue-black is obtained; whereas with other black colors from six to ten per cent. would be required to produce the same result.

Chemically, our process is characterized by the employment of substitute meta-diamins, such as diphenylized meta-phenylene-diamin, which before our invention has not been employed in the manufacture of azo-coloring matters.

This dark coloring matter may be designated as a secondary diazo derivative or a doubly-diazotized derivative of alkylized metadiamins and the novelty consists in the employment of this class of amins, resulting in the production of coloring matters of great coloring power.

Having now particularly described and ascertained the nature of our said invention and in what manner the same is to be performed, we declare that what we claim is—

1. The herein described process for the production of coloring matters, said process consisting in combining diazo derivative of the specified mono and disulphonic acids, with naphthylamin, again diazotizing the compound obtained, and combining it with an alkylized secondary or tertiary meta-diamin (such as meta-phenylenediamin) as set forth.

2. The described coloring matter, being a secondary diazo or twice-diazotized derivative of alkylized meta-diamin, of a black or dark color, but slightly soluble in water, characterized by great coloring power and the property of dyeing wool in very deep colors that resist the action of soap, the atmosphere and light, as set forth.

In witness whereof we have hereunto signed our names in the presence of two subscribing witnesses.

ALCIDE FRANÇOIS POIRRIER.
   DANIEL AUGUSTE ROSENSTIEHL.

Witnesses:
 JULES ARMENGAUD, Jeune,
 ROBT. M. HOOPER.